(12) United States Patent
Jeon et al.

(10) Patent No.: US 7,381,024 B2
(45) Date of Patent: Jun. 3, 2008

(54) LPG TANK INSERTION APPARATUS FOR AUTOMOBILES

(75) Inventors: Sun-Kyu Jeon, Hwaseong-si (KR); Kook-Hyun Shim, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 264 days.

(21) Appl. No.: 11/299,376

(22) Filed: Dec. 8, 2005

(65) Prior Publication Data

US 2007/0090659 A1    Apr. 26, 2007

(30) Foreign Application Priority Data

Oct. 26, 2005    (KR)    ...................... 10-2005-0101197

(51) Int. Cl.
*B66F 9/00* (2006.01)
(52) U.S. Cl. ...................... 414/590; 212/223; 212/251; 212/901; 294/103.1; 294/119.1
(58) Field of Classification Search ................ 414/589, 414/590; 269/71; 212/901, 252, 251, 249, 212/223; 294/119.1, 103.1, 12, 13; 254/325, 254/326, 335, 336, 332, 270
See application file for complete search history.

(56) References Cited

U.S. PATENT DOCUMENTS

| 1,611,738 A | * | 12/1926 | Guilford ...................... 72/414 |
| 4,090,625 A | * | 5/1978 | Walters ...................... 414/743 |
| 4,997,509 A | | 3/1991 | Fujii |
| 5,090,580 A | * | 2/1992 | Nelson ........................ 212/180 |
| 5,456,002 A | | 10/1995 | Barnhart et al. |
| 5,996,207 A | | 12/1999 | Brown et al. |

FOREIGN PATENT DOCUMENTS

| JP | 07-061799 | 3/1995 |
| JP | 07-076290 | 3/1995 |
| JP | 11-019894 | 1/1999 |

* cited by examiner

*Primary Examiner*—Donald Underwood
(74) *Attorney, Agent, or Firm*—Morgan Lewis & Bockius LLP

(57) ABSTRACT

An LPG tank insertion apparatus for automobiles includes a rotary column with a lift body, a support arm mounted to the lift body, an actuating cylinder hingedly connected to the support arm, and a kingpin connected to the support arm. The actuating cylinder and the kingpin are both attached to a rotating plate that rotates in response to the actuating cylinder. The rotating plate is connected to a clamping device that selectively clamps an LPG tank which, in turn, rotates in response to the actuating cylinder so that it can be inserted in an automobile trunk whose opening is smaller than the length of the tank.

6 Claims, 4 Drawing Sheets

LPG TANK INSERTION APPARATUS FOR AUTOMOBILES

CROSS-REFERENCE TO RELATED APPLICATIONS

The present application is based on, and claims priority from, Korean Application Serial Number 10-2005-0101197, filed on Oct. 26, 2005, the disclosure of which is hereby incorporated by reference herein in its entirety.

FIELD OF THE INVENTION

The present invention relates to LPG tank insertion apparatuses for automobiles and, more particularly, to an LPG tank insertion apparatus for automobiles which makes it possible for an LPG tank to be easily inserted into a trunk of an automobile even if the LPG tank is larger than the opening of the trunk.

BACKGROUND OF THE INVENTION

Generally, in automobiles using liquid petroleum gas (LPG) as fuel, an LPG tank is installed in the trunk of the automobile. Typically, because the LPG tank is smaller than the opening of the trunk, there is no particular problem with the insertion and installation of the LPG tank.

However, recently, automobile models having trunks, the openings of which are smaller than the size of an LPG tank (in detail, the length of a mounting plate, to which a lower side of the LPG tank is mounted, is longer than the length of the opening of the trunk), have been marketed. In this case, it is not easy to insert the LPG tank into the trunk using a typical hanger having a wire and a pulley.

To insert the LPG tank into the trunk having the above-mentioned condition, the LPG tank should be rotated and then kept in the rotated position until the LPG tank is inserted into the trunk. However, when using a conventional hanger, because the wire connected to the LPG tank interferes with the edge of the opening of the trunk, there is difficulty in insertion of the LPG tank into the trunk after the LPG tank has been rotated to a position suitable for insertion. Furthermore, it is very difficult for a worker to manually adjust the position of the relatively heavy LPG tank (approximately 27 kg) and to insert the LPG tank into the trunk while maintaining the position thereof. As well, if the body of the LPG tank or the wire bumps against the edge of the opening of the trunk or a trunk panel disposed in the trunk, the LPG tank or the trunk panel may be damaged. Therefore, this burdens the worker, thus reducing workability and productivity and increasing safety hazard occurrences.

SUMMARY OF THE INVENTION

Embodiments of the present invention provide an LPG tank insertion apparatus for automobiles which makes it possible for an LPG tank to be adjusted to a position suitable for insertion of an LPG tank into the trunk of an automobile and to be maintained in that position, so that a worker can easily insert the tank using a small force, and the LPG tank does not interfere with a trunk panel during the insertion process.

An LPG tank insertion apparatus for an automobile according to an embodiment of the present invention includes a rotary column provided with a lift body. A support arm is horizontally mounted to the lift body. An actuating cylinder is coupled at one end to a fastening plate, which is attached near an end of the support arm by a hinge. A rotating plate is coupled to a cylinder rod of the actuating cylinder by a hinge. A kingpin rotatably couples an end of the support arm to the rotating plate, so that, when the actuating cylinder is operated, the rotating plate is rotated to a position allowing the LPG tank to be inserted into the trunk of the automobile. A clamping device is mounted at each of upper and lower positions to the rotating plate. A pneumatic pressure supply device supplies pneumatic pressure both to the actuating cylinder and to clamping cylinders provided in the clamping devices. A control switch is provided on the support arm so as to enable a worker to control the pneumatic pressure supply device, thus operating the actuating cylinder and the clamping cylinders.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
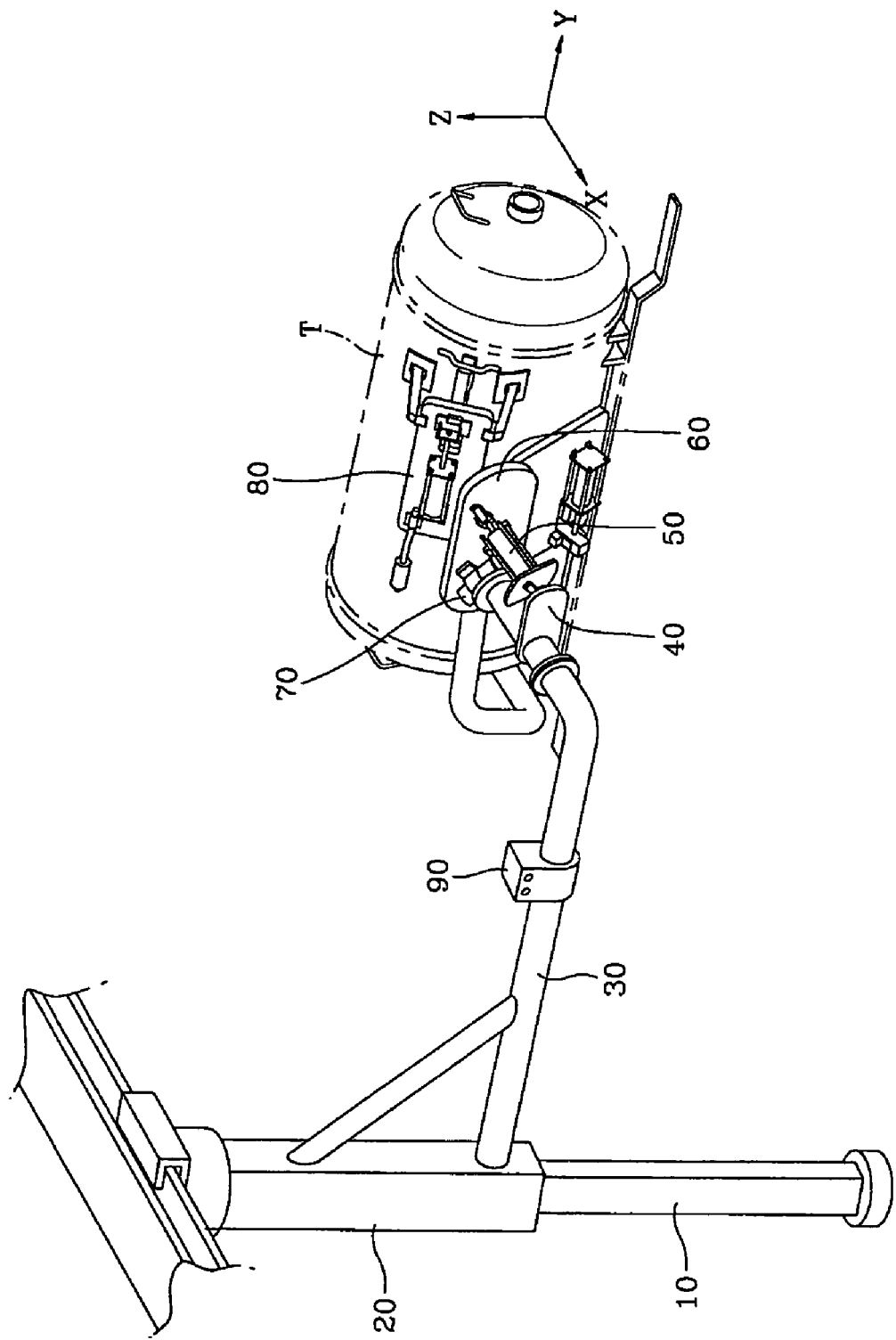
FIG. 1 is a perspective view of an LPG tank insertion apparatus for automobiles, according to a preferred embodiment of the present invention.
Figure 2:
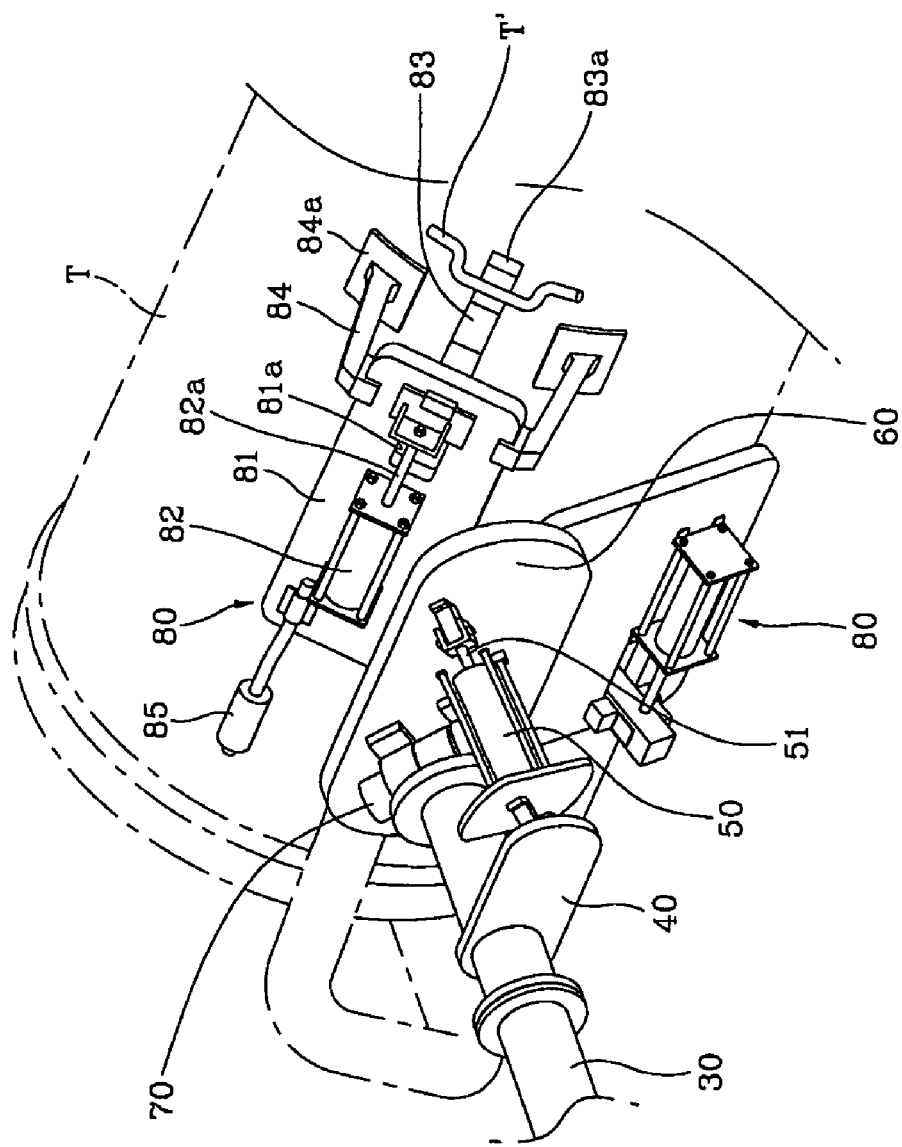
FIG. 2 is a perspective view showing an enlargement of an important part of the LPG tank insertion apparatus of FIG. 1.

Hereinafter, a preferred embodiment of the present invention will be described in detail with reference to the attached drawings.

As shown in the drawings, the LPG tank insertion apparatus of the present invention includes a rotary column 10, which is fixed at upper and lower ends thereof, but a body of which is rotatable. A lift body 20 is provided on the rotary column 10 so as to be movable upwards and downwards along the rotary column 10. A support arm 30 is mounted to the lift body 20 in a direction parallel to a support surface.

An end of the support arm 30 is bent at a right angle. A support plate 40 is provided near the end of the bent portion of support arm 30.

Furthermore, an end of a main body of an actuating cylinder 50, which is supplied with pneumatic pressure from a pneumatic pressure supply device (not shown), is coupled to the support plate 40 by a hinge.

A cylinder rod 51 of the actuating cylinder 50 is hinged to a front surface of a rotating plate 60.

The end of the support arm 30 is hinged to the front surface of the rotating plate 60 by a kingpin 70. The kingpin 70 is provided at a predetermined angle such that, when the rotating plate 60 is completely rotated and pushed by the cylinder rod 51 of the actuating cylinder 50, an LPG tank (T) held by clamping devices 80, which will be explained later herein, is oriented in a position allowing the LPG tank (T) to be inserted into the trunk of an automobile without interference.

Meanwhile, the clamping devices 80 are mounted at respective upper and lower positions to a rear surface of the rotating plate 60. Each clamping device 80 includes a fastening plate 81 which is mounted to the rotating plate 60, and a clamping cylinder 82 which is mounted to a front surface of the fastening plate 81. Each clamping device 80 further includes a clamping member 83 which is moved by a cylinder rod 82a of the clamping cylinder 82 along a guide slot 81a formed through the fastening plate 81, and a support 84 which is provided on each of upper and lower side edges of the fastening plate 81. A surface contact part 84a, which is brought into surface contact with the outer surface of the LPG tank (T), is provided under a lower end of the support 84.

Furthermore, latch holders (T') are mounted to the LPG tank (T), so that, when the surface contact part 84a of each support 84 is brought into close contact with the outer surface of the LPG tank (T) and each clamping member 83 is advanced by the associated clamping cylinder 82, an insert latch 83a provided on an end of the clamping member 83 is inserted into and locked to the associated latch holder (T').

The two clamping devices 80, positioned at upper and lower positions, have the same construction, but their installation directions and operating directions are opposite to each other.

As well, a handle 85 may be provided on the fastening plate 81 of the upper clamping device 80 for ease of handling by a worker during an insertion process.

The actuating cylinder 50, which rotates the rotating plate 60, and the clamping cylinders 82, which advance and retract the clamping member 83, are pneumatic cylinders connected to the pneumatic pressure supply device through pressure hoses, but this construction is well known to those skilled in the art and, therefore, is omitted in the drawings.

Furthermore, in the case that there are several LPG tank insertion apparatuses in a plant, the pneumatic pressure supply device may comprise several independent devices, each of which includes a compressor, a pressure tank, a valve, etc., and each of which is independently coupled to a respective LPG tank insertion apparatus. Alternatively, the pneumatic pressure supply device may comprise a single pneumatic pressure supply system disposed at a predetermined position in the plant. The present invention is not limited to any one case.

A control switch 90 controls the electronic valve of the pneumatic pressure supply device. In one embodiment of the present invention, the control switch 90 is provided on the support arm 30.

Figure 3:
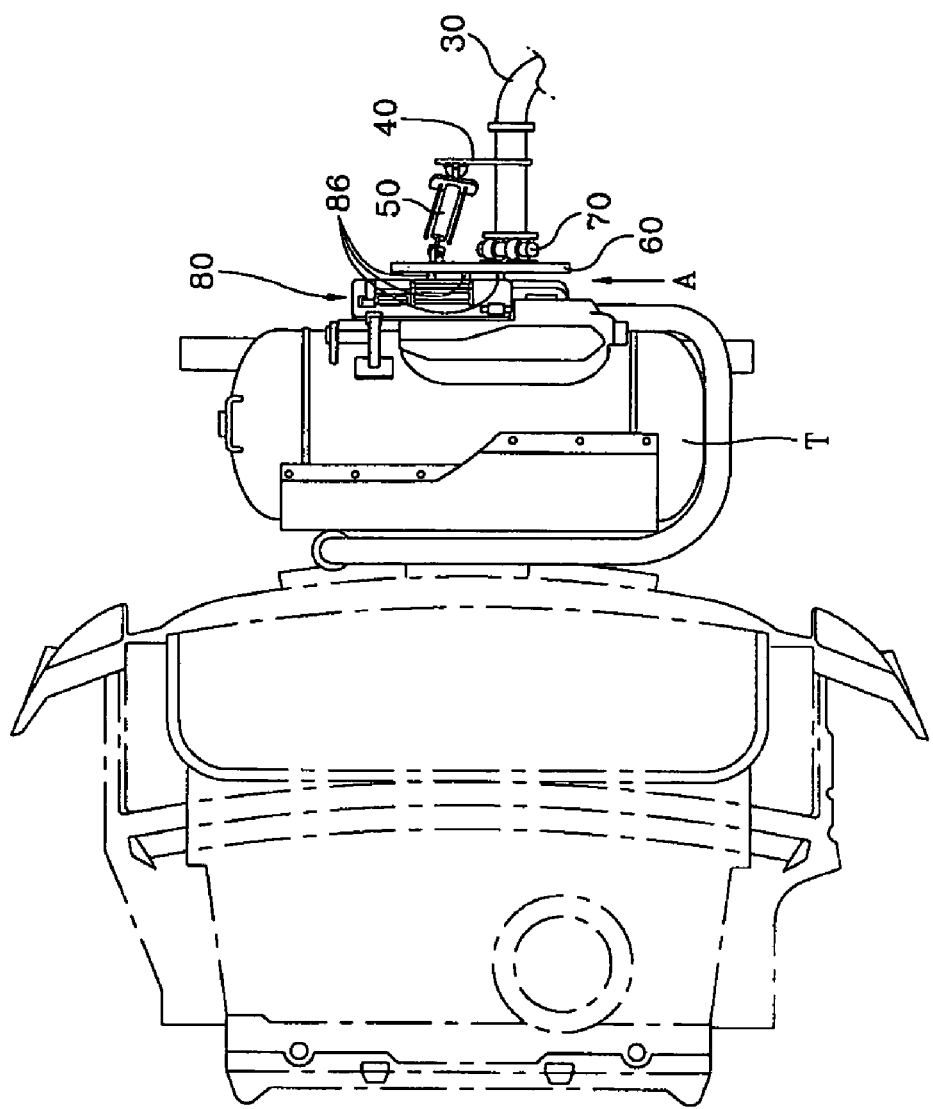
FIG. 3 is a plan view showing the LPG tank insertion apparatus of FIG. 1 when is not in operation.

Fastening plates 81 of the clamping devices 80 are mounted to the rotating plate 60 through an arch rod 86, which is made of spring steel and has an arch shape. This construction mitigates impact when the surface contact parts 84a of the clamping devices 80 are brought into contact with the outer surface of the LPG tank (T). The arch rod 86 is fastened at a medial portion thereof to the rotating plate 60 and is fastened at opposite ends thereof to the respective fastening plates 81 of the upper and lower clamping devices 80. That is, in the plan view of FIG. 3, the characteristic shape of the arch rod 86 is not shown, but, when viewing the arch rod 86 from the direction indicated by the arrow A, the medial portion of the arch rod 86 is convex towards the rotating plate 60, and the opposite ends thereof points in directions opposite to the rotating plate 60, that is, in directions of the fastening plates 81, thus forming an arch shape.

The coupling of the arch rod 86 to the rotating plate 60 and the fastening plates 81 is conducted by welding or by coupling units, such as mounting brackets and locking bolts.

The operation and effect of the present invention will be described herein below.

The worker contacts the surface contact part 84a with the outer surface of the LPG tank (T) by moving the support arm 30 in upward, downward and circumferential directions such that the clamping members 83 are placed adjacent to the latch holders (T').

Subsequently, the worker manipulates the control switch 90 such that pneumatic pressure is supplied from the pneumatic pressure supply device to the clamping cylinders 82. When each clamping cylinder 82 is operated, each cylinder rod 82a pushes the associated clamping member 83, so that the insert latch 83a of the clamping member 83 is inserted into and locked to the latch holder (T').

Then, the LPG tank (T) is securely coupled to the support arm 30 and is movable along with the support arm 30.

The worker completely raises the support arm 30, as shown in FIG. 1. Here, because a balance weight (not shown), which has the same weight and uses a pulley and a wire, is provided in the lift body 20, the worker can easily raise the support arm 30 with a small force. In another embodiment, the power assist uses a spring (not shown). Balance weights and spring are well-known techniques in the art, therefore further explanation is deemed unnecessary.

As such, after the support arm 30 is lifted, the worker manipulates the control switch 90 to operate the actuating cylinder 50.

Figure 4:
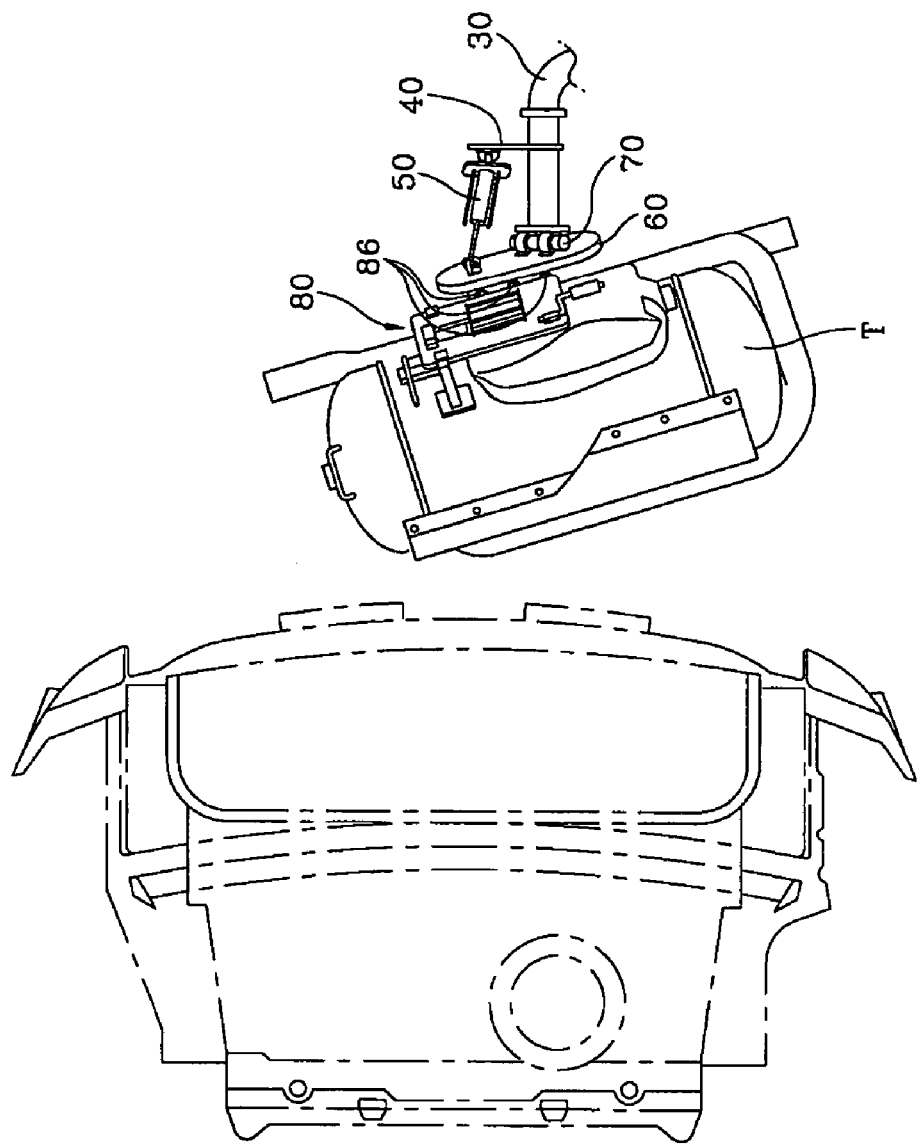
FIG. 4 is a plan view showing the operation of the LPG tank insertion apparatus of FIG. 1.

When the cylinder rod 51 of the actuating cylinder 50 is completely advanced, the rotating plate 60 is rotated around the kingpin 70. Then, the LPG tank (T) is rotated at desired angles on the X, Y and Z axes. As a result, the LPG tank (T) is oriented in a position allowing the LPG tank (T) to be inserted into a trunk of an automobile without interfering either with the edge of the opening of the trunk or with a trunk panel disposed in the trunk. This state is shown from the downward direction in FIG. 4.

Therefore, the worker need not worry about damaging the LPG tank (T) or the trunk panel due to the LPG tank (T) contacting the edge of the opening of the trunk or the trunk panel. Thus, the worker can rapidly rotate the support arm 30 and insert the LPG tank (T) into the trunk. As a result, the workability and productivity are markedly enhanced.

As is apparent from the foregoing, the present invention makes it possible for an LPG tank to be adjusted in a position suitable for insertion of the LPG tank into a trunk of an automobile without interfering either with the edge of the opening of the trunk or with a trunk panel disposed in the trunk, merely by simple control of a control switch, so that a worker can easily perform an insertion process with a small force without worrying about damage to the LPG tank or to other elements of the automobile.

What is claimed is:

1. An LPG tank insertion apparatus for an automobile, comprising:
    a rotary column provided with a lift body;
    a support arm mounted to the lift body;
    a support plate connected to the support arm;
    an actuating cylinder hingedly coupled at an end thereof to the support plate;
    a rotating plate hingedly coupled to a cylinder rod of the actuating cylinder;
    a kingpin rotatably coupling an end of the support arm to the rotating plate;
    at least one clamping device mounted to the rotating plate;
    a means for selectively actuating the actuating cylinder; and
    a means for selectively clamping the at least one clamping device to an LPG tank.

2. The LPG tank insertion apparatus as defined in claim 1, wherein each of the at least one clamping devices comprises:
- a fastening plate mounted to the rotating plate;
- a clamping cylinder mounted to the fastening plate;
- a clamping member selectively moved by a cylinder rod of the clamping cylinder and comprising an insert latch; and
- at least one support provided on the fastening plate, and comprising a surface contact part that contacts the LPG tank;

and wherein the LPG tank comprises:
- at least one latch holder, wherein the insert latch of the clamping member is selectively inserted into the at least one latch holder.

3. The LPG tank insertion apparatus as defined in claim 2, wherein the fastening plate of the at least one clamping device comprises a handle.

4. The LPG tank insertion apparatus as defined in claim 2, wherein the fastening plate of the at least one clamping device is mounted to the rotating plate with an elastic arch rod.

5. The LPG tank insertion apparatus as defined in claim 1, wherein the means for selectively actuating the actuating cylinder comprises:
- a switch provided on the support arm that controls pneumatic pressure supplied to the actuating cylinder.

6. The LPG tank insertion apparatus as defined in claim 2, wherein the means for selectively clamping the at least one clamping device to an LPG tank comprises:
- a switch provided on the support arm that controls pneumatic pressure supplied to the clamping cylinder of the at least one clamping device.

\* \* \* \* \*